J. T. BUSH.
SHOCK ABSORBER.
APPLICATION FILED JUNE 7, 1916.

1,218,370.

Patented Mar. 6, 1917.

Witnesses:
J. M. Haines
B. G. Richards

Inventor,
John T. Bush
by Joshua R. H. Potts
his Attorney.

UNITED STATES PATENT OFFICE.

JOHN T. BUSH, OF EVANSTON, ILLINOIS.

SHOCK-ABSORBER.

1,218,370.  Specification of Letters Patent.  Patented Mar. 6, 1917.

Application filed June 7, 1916. Serial No. 102,312.

*To all whom it may concern:*

Be it known that I, JOHN T. BUSH, a citizen of the United States, and a resident of Evanston, county of Cook, and State of Illinois, have invented certain new and useful Improvements in Shock-Absorbers, of which the following is a specification.

My invention relates to improvements in shock absorbers, and has for its object the provision of an improved construction of this character arranged to deaden shocks due to the running of automobiles and the like.

The invention consists in the combinations and arrangements of parts hereinafter described and claimed.

Figure 1:
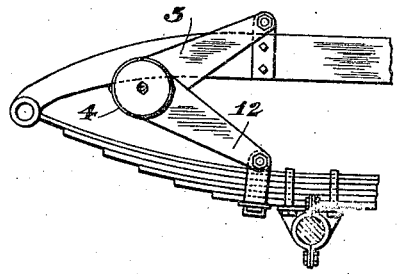
Figure 2:
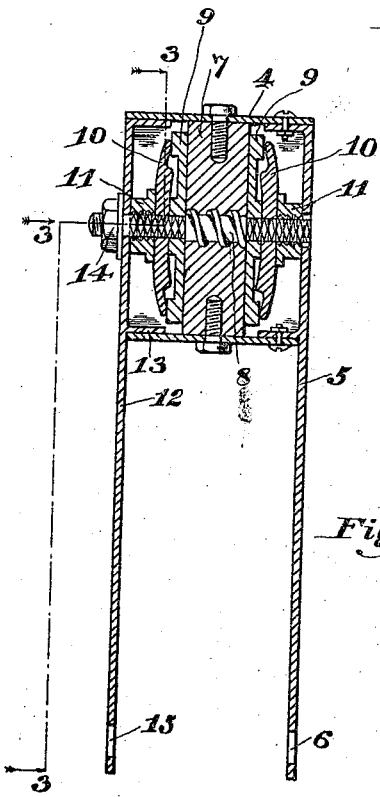
Figure 3:
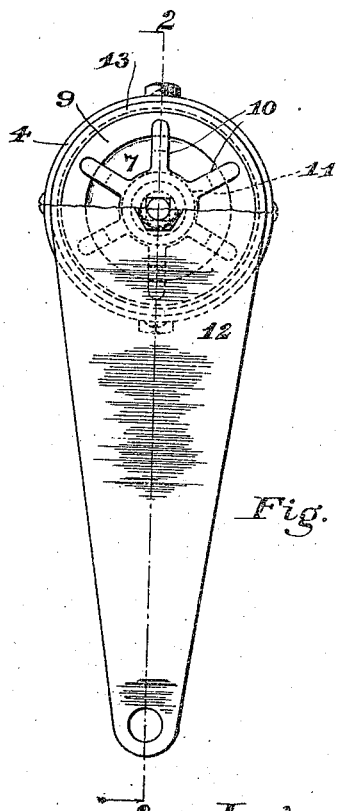

The invention will be best understood by reference to the accompanying drawing forming a part of this specification, and in which, Figure 1 is a view showing the shock absorber in position of use, Fig. 2 an enlarged section of the shock absorber taken on line 2—2 of Fig. 3, and Fig. 3—a section taken on line 3—3 of Fig. 2.

The preferred form of construction as illustrated in the drawing, comprises a central casing or housing 4 having an arm 5 secured to one side thereof closing said side, said arm being provided with a perforation 6 to receive a bolt for attaching the same in position of use. The housing 4 is provided with a central partition 7 rigidly secured therein and an operating stem 8 is threaded in said partition and projects from each face thereof, the projecting ends of said stem being squared and threaded. Friction members 9 are fitted over the projecting ends of stem 8 to rotate therewith and contact frictionally with opposite faces of partition 7. Springs 10 are also fitted over the projecting ends of stem 8 and nuts 11 are threaded thereon to serve as a means of adjusting the tension of the springs 10. Another oscillating arm 12 is provided with a central hub or cup 13 fitting loosely within and closing the other end of the housing 4, said hub being provided with a central square perforation fitting the corresponding squared end of stem 8 so as to connect the arm 12 operatively with said stem. Nut 14 threaded on stem 8 serves to secure the arm 12 and cup 13 in place and arm 12 is provided with a bolt hole 15 for securing it in operative position as indicated in Fig. 1.

By this arrangement it will be observed that when the shock absorber is secured in position as indicated in Fig. 1 the oscillation of arms 5 and 12 toward each other will cause one of the friction members 9 to contact with the corresponding face of partition 7 with gradually increasing frictional force, and oscillation of said arms in the other direction will apply the other friction member 9 with gradually increasing force, thus gradually checking the motion of the parts and thus deadening the shocks. Likewise the friction exerted by the friction members 9 may be independently adjusted, thus serving further as a means for nicely adjusting the parts to deaden the shocks.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A shock absorber comprising a central housing; an oscillatory arm secured to one side of said housing; a central partition in said housing; a stem threaded in said partition and projecting from opposite sides thereof; friction members mounted on the projecting ends of said stem and contacting with opposite sides of said partition; and an oscillatory arm secured to the projecting end of said stem opposite to said other arm, substantially as described.

2. A shock absorber comprising a central housing; an oscillatory arm secured to one side of said housing; a central partition in said housing; a stem threaded in said partition and projecting from opposite sides thereof, the projecting ends of said stem being squared and threaded; friction members fitting over said squared ends and contacting with opposite sides of said partition; springs applying said friction members; nuts on said squared ends adjusting the tension of said springs; and an oscillatory arm secured to the projecting end of said stem opposite to said other arm, substantially as described.

In testimony whereof I have signed my name to this specification in the presence of two subscribing witnesses.

JOHN T. BUSH.

Witnesses:
    JOSHUA R. H. POTTS,
    CORA F. SCHIEBER.